Feb. 9, 1960 H. A. HARRIMAN ET AL 2,924,769

PEAK READING CIRCUIT

Filed June 16, 1958

Inventors:
Herbert A. Harriman
Joseph L. Paine
by Richard E. Hosley
Their Attorney United States Patent Office
2,924,769
Patented Feb. 9, 1960

2,924,769

PEAK READING CIRCUIT

Herbert A. Harriman, Peabody, Mass., and Joseph L. Paine, Springfield, Pa., assignors to General Electric Company, a corporation of New York Application June 16, 1958, Serial No. 742,115

12 Claims. (Cl. 321—8)

This invention relates to an improved circuit for deriving a unidirectional voltage which varies as the peak displacement of an alternating or pulsating wave form.

Peak reading circuits presently known for developing zero-to-peak and peak-to-peak signals commonly utilize a capacitor upon which the rectifier input signal builds up during half-waves or alternations of like polarity to that of the peak value. During the intermediate alternations the capacitor discharges to some extent by a shunting resistance arrangement. In order that the charge across the capacitor will be very nearly the true peak value, such an arrangement inherently requires that the time constant of the discharge resistance and the capacitor be relatively long. For some circuits the long time constant causes no deleterious effects; however, for many uses a peak reading circuit is required in which the peak voltage developed will diminish rapidly or even decrease substantially to zero in a very short time after the input signal is lowered or removed.

It is an object of this invention to provide an improved peak reading circuit in which the peak voltage developed may be substantially reduced to zero almost immediately upon the removal of the signal under measurement.

It is a further object of this invention to provide an improved peak reading circuit with a short response time able to quickly follow decreases as well as increases of the input signal.

It is a still further object of this invention to provide a peak reading circuit in which a short discharge time constant relative to the time interval between input pulses is provided for the charging capacitor while maintaining accuracy of peak indications by providing a long discharge time constant for steady state and increasing input signals.

Further objects and advantages of our invention will become apparent as the following description proceeds and the features of novelty which characterize my invention will be pointed out with particularity in the claims annexed to and forming a part of this specification.

In accordance with one form of this invention, the rectified input signal is applied to a capacitor which charges up to the peak input voltage and can discharge only through a biased diode during periods when the bias voltage decreases sufficiently relative to the capacitor voltage. The bias voltage may be developed by a peak reading circuit energized by the input signal and is normally greater than the capactor voltage. When the signal voltage decreases, the bias voltage follows quickly, thus enabling the capacitor to discharge through the diode down to a level indicative of the lower input signal.

For a better understanding of our invention, reference may be had to the accompanying drawings in which.

Figure 1:
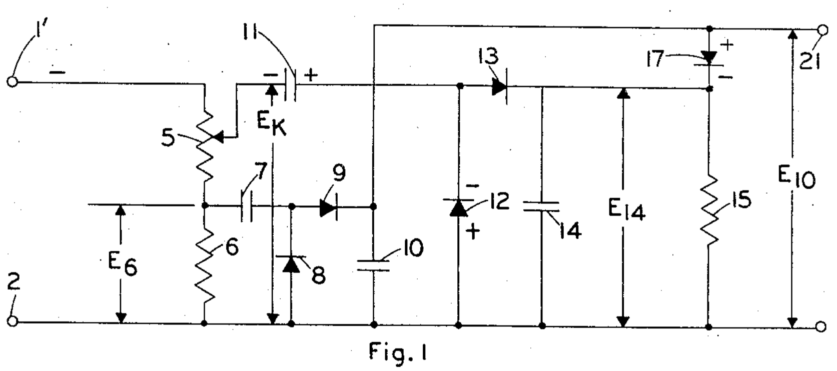
Figure 1 is a circuit diagram illustrating the invention in a peak-to-peak circuit.

Referring to Figure 1, the input signal is applied between input terminal 1′ and common line 2 to a pair of resistors 5 and 6. The voltage $E_6$ developed across resistor 6 due to current flow through resistors 5 and 6 is coupled by coupling capacitor 7 through a rectifying arrangement comprising diodes 8 and 9 to charging capacitor 10. The circuit described thus far is essentially the peak reading measurement circuit. The voltage $E_k$ developed across resistances 5 and 6 is utilized in a cooperating bias or control circuit and is coupled by capacitor 11 through the rectifying arrangement comprising diodes 12 and 13 to charging capacitor 14 which is shunted by discharge impedance or resistor 15. The voltage developed across the charging or output capacitor 10 is fed directly to the output terminal 21 and also via diode 17 to that end of resistor 15 which is remote from the common line 2. The diodes or unilaterally conductive devices may be either of the vacuum or the dry contact type and may be connected with the polarity shown or with reversed polarity. The common junctions between the pairs of diodes should connect unlike elements of the diodes. The resistors 5 and 6 may be connected across the circuit under measurement for a peak reading voltage indicator or in series with the circuit under measurement for a peak reading current indicator.

In operation, since the current flow through resistances 5 and 6 is the same, it is apparent that the voltage developed across both resistances and designated $E_k$ in Figure 1 is of larger magnitude than the voltage $E_6$ developed across resistor 6. 5 and 6 can be impedance devices other than pure resistances.

The circuit consisting of capacitor 11, diodes 12 and 13, and charging capacitor 14 acts in a manner like a conventional peak-to-peak reader circuit. During the alternation in which line 2 is positive relative to line 1′, current flows through diode 12 to charge capacitor 11 toward the peak value of a single alternation or half-cycle with the polarity as indicated in Figure 1. On the succeeding alternation line 1′ is positive relative to line 2, and voltage $E_k$ is in a series aiding circuit with that voltage developed across capacitor 11 on the preceding alternation. The summation of the two voltages is applied through diode 13 to charge capacitor 14 toward the peak-to-peak value. In a conventional peak-to-peak circuit the resistance 15 would necessarily be of a large value so as to provide, in combination with capacitor 14, a large RC time constant to insure that the voltage developed across capacitor 14 by like polarity alternations of the input signal will not be substantially discharged during the intermediate alternations in which current pulses are not supplied through diode 13. Such circuit parameters necessarily limit the discharge rate of capacitor 14 so that when the applied signal was decreased or discontinued, capacitor 14 would slowly discharge toward a value indicative of the lower input signal.

In order to provide a circuit in which the peak-to-peak voltage developed across the charging capacitor will be able to discharge quickly and follow the input signal, a second circuit consisting of capacitor 7, diodes 8 and 9, and capacitor 10 is provided. This circuit operates essentially the same as the circuit including capacitor 14 so that capacitor 7 is charged by one alternation of the applied signal and upon the subsequent alternation, is in series with the voltage $E_6$ so as to charge capacitor 10 toward a voltage equalling the sum of the peaks of the voltages $E_6$ and that developed across capacitor 7. Since the voltage $E_6$ is of a smaller magnitude than the voltage $E_k$, the capacitor 10 charges to a lower value than capacitor 14.

The voltage developed across capacitor 10 is utilized as a measure of the peak-to-peak voltage and its discharge time constant is extremely large enabling accurate peak readings. As long as the voltage $E_{14}$ developed across capacitor 14 is larger than $E_{10}$ developed across capacitor 10, $E_{14}$ effectively biases diode 17 off, preventing current flow through diode 17. Since the voltage $E_{14}$ is not utilized as an indication of peak voltage, it is not essential to prevent discharge of the capacitor 14 during alternations where no charging takes place and resistance 15 and capacitance 14 can together form a relatively short RC time constant. Upon a sharp decrease in signal, capacitor 14 discharges quickly and the voltage $E_{14}$ decreases rapidly below that of $E_{10}$ so that the relative polarities across diode 17 are reversed. Capacitor 10 then discharges through the relatively low resistance path of diode 17 and resistor 15 so as to quickly indicate the new level of peak-to-peak input voltage.

It is thus apparent that the voltage $E_{14}$ is utilized as a control or bias voltage to normally prevent the rapid discharge of capacitor 10 and so maintain $E_{10}$ as a true indication of peak-to-peak input voltage and to enable the output to quickly decrease on a decrease in the input signal at a rate which is not inherently lengthy as is the case in a conventional peak-to-peak circuit. It has been found desirable to utilize a diode 17 which exhibits high inverse impedance. A silicon type of diode has proved satisfactory.

In practice it has been found that the determination of the relative values $E_6$ and $E_k$ may best be accomplished at the lower limit of the frequency range at which the circuit is designed to operate. At the low frequency the control voltage $E_{14}$ developed across capacitor 14 has the most time to discharge. The relative values of resistors 5 and 6 should be adjusted so that during discharge, the voltage $E_{14}$ does not dip below that of $E_{10}$ to prevent the partial discharge of capacitor 10 by conduction through diode 17 and resistor 15. Resistor 5 may conveniently be of the varibale type in order to facilitate adjustment of the circuit for the input frequency. The relationship of the voltages $E_{10}$ and $E_{14}$ is shown diagrammatically in Figure 2.

Figure 2:
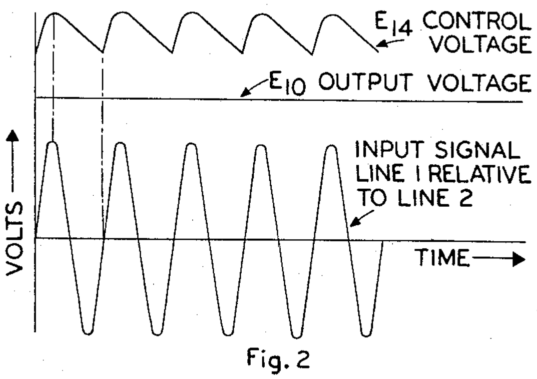
Figure 2 is a plot of voltages which occur during the operation of the circuit and which are useful in explaining the operation of the invention.

Referring to Figure 2, it may be seen that with a constant amplitude input signal the output voltage $E_{10}$ is substantially a steady-state voltage, due to capacitor 10 being charged to the peak-to-peak value without a discharge path. During the positive alternation of the input signal, the control voltage $E_{14}$ tends to approach a peak-to-peak value as determined by the voltage developed across capacitor 11 plus $E_k$. When the input signal swings negative, capacitor 14 discharges through resistor 15 at a rate determined by their RC time constant and this discharge continues until the input signal again swings positive. $E_k$ should be made sufficiently greater than $E_6$ through proper selection or adjustment of resistors 5 and 6 relative to resistor 6 so that the control voltage $E_{14}$ does not drop below the value $E_{10}$ in order to prevent conduction through diode 17 and a discharge of capacitor 10 during steady state input signal conditions. For best response it is often desirable to allow $E_{14}$ to drop down to the value $E_{10}$.

In determining the proper setting for $R_5$ at a particular frequency, a constant amplitude input signal should be used. $R_5$ should be increased from a minimum resistance value until the output of the circuit $E_{10}$ stops increasing. A calibrating scale associated with $R_5$ could be used to facilitate adjustment for the desired frequency.

While the control voltage $E_{14}$ was shown in Figure 1 as being developed by a peak-to-peak circuit consisting of capacitors 11 and 14, diodes 12 and 13, and resistor 15, the only criteria for the control voltage $E_{14}$ is that it normally be larger in magnitude than the output voltage developed across capacitor 10 and that it vary in magnitude as the signal voltage varies. However, $E_{14}$ does not have to be in phase with $E_{10}$. These requirements can conveniently be accomplished by many suitable methods of rectification well known in the art and not necessarily through the use of the exact peak-to-peak circuit disclosed. $E_{14}$ can be developed, for example, by a zero-to-peak circuit. Alternatively, a transformer coupled rectifying arrangement could be used in which a step-up transformer (not shown) is connected across the input lines instead of the series resistors 5 and 6, to provide an input to the circuit developing the control voltage $E_{14}$, and the input lines are connected directly to the circuit developing the output voltage. The control voltage circuit would thus be energized by a voltage which varies as the voltage supplied to the circuit developing the output voltage but which is greater in magnitude.

Figure 3:
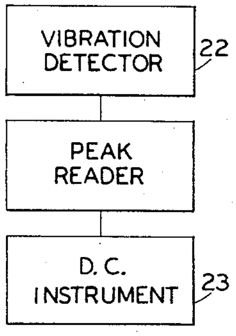
Figure 3 is a block diagram of a device embodying the invention.

Referring to Figure 3, a peak reading circuit embodying the invention is shown in combination with a D.-C. indicating arrangement in which the output voltage is utilized as an indication on a D.-C. instrument of the peak signal input voltage. The signal input voltage may conveniently be obtained from a velocity type of vibration detector 22 as shown in the block diagram of Figure 3, or may be any alternating or pulsating wave form which is desired to be measured. The peak voltage developed by the circuit may be conveniently displayed by the D.-C. electrical indicating instrument 23.

Figure 4:
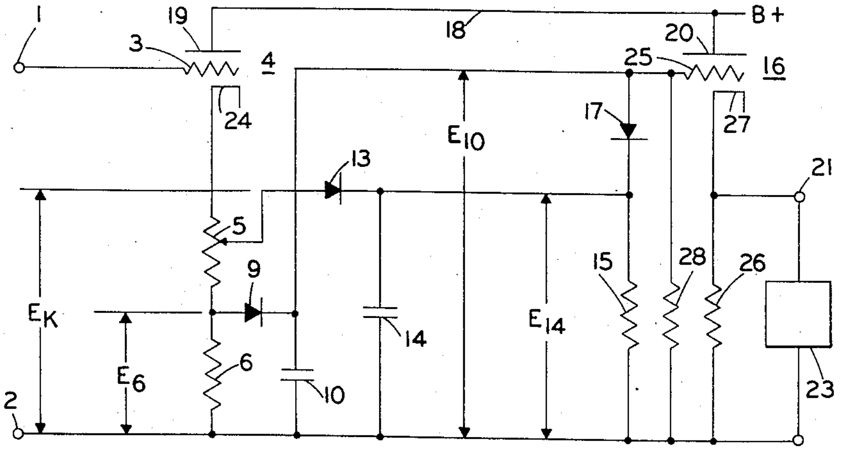
Figure 4 is a circuit diagram embodying the invention in a zero-to-peak metering circuit.

Figure 4 discloses a peak reading circuit in which both $E_{10}$ and $E_{14}$ are developed by zero-to-peak circuits. Referring to Figure 4, it can be seen that impedance matching cathode follower circuits utilizing vacuum discharge devices or tubes 4 and 16 are provided for both the input and the output of the peak reading circuit. Corresponding parts are marked with similar numbers to those used in Figure 1. The input signal is applied between input terminal 1 and common line 2 and applied directly to the grid 3 of the tube 4. The cathode 24 of tube 4 is connected to the common line 2 through a pair of resistors 5 and 6 which develop voltages which are a function of the input signal. A positive operating potential is supplied via line 18 to plate 19 of tube 4 and also to plate 20 of tube 16. The output voltage $E_{10}$ is applied to the grid 25 of cathode follower tube 16. A cathode resistance 26 is connected between the cathode 27 and common line 2 and the output leading to the D.-C. instrument 23 is taken between the common line 2 and terminal 21 connected to cathode 27. Since some plate current will flow through tube 16 even with zero input to grid 25, a suppressed zero instrument is desirable. Alternatively, an indicating arrangement utilizing a balanced D.-C. stage may be used.

It should be noted that in the embodiment illustrated in Figure 4, both $E_{10}$ and $E_{14}$ are developed by zero-to-peak reading circuits rather than peak-to-peak reading circuits. The voltage developed across capacitor 10 is accomplished through rectified pulses developed by diode 9. Capacitor 10 will charge to the peak voltage of a single alternation of the voltage $E_6$. Capacitor 7 and diode 8 are not utilized in this circuit. Similarly, a zero-to-peak voltage is developed across capacitor 14 by the rectifying action of diode 13. The operation of the circuit shown in Figure 4 is essentially the same as that shown in Figure 1. It is apparent that the control voltage $E_{14}$ could be developed by a peak-to-peak circuit even though the output voltage $E_{10}$ only indicated a zero-to-peak voltage. Alternatively, the voltage $E_{14}$ could be obtained by a plurality of rectifying arrangements well known in the art.

A relatively large resistance which may be of the magnitude of 3.3 megohms may be connected across the output of the peak reading circuit in order to allow the charging capacitor to discharge slowly when successive signals are only slightly less than preceding signals. Such a resistor is shown in Figure 4 in parallel with the charging capacitor 10. If successive signals are more appreciably decreased, then the conduction of diode 17 will quickly discharge the capacitor 10 as described above.

Therefore, while particular embodiments of the subject invention have been shown and described herein, these are in the nature of description rather than limitation, and it will occur to those skilled in the art that various changes, modifications and combinations may be made within the province of the appended claims and without departing either in spirit or scope from this invention in its broader aspects.

What we claim as new and desire to secure by Letters Patent of the United States is:

1. For use in a peak reading device, a circuit comprising a capacitor adapted to accumulate a charge proportional to the peak input voltage, a control voltage which under steady state conditions is of greater magnitude than the voltage developed across said capacitor, a unilaterally conductive device connected between said control voltage and said capacitor voltage in a manner such that said device is non-conducting under steady state conditions, and a discharge path for said capacitor voltage comprising said unilaterally conducting device and an impedance which in combination with said capacitor provides a short RC time constant relative to the time interval between input pulses, whereby upon a decrease of input voltage, said control voltage decreases to enable the unilaterally conductive device to become conductive and provide a discharge path for said capacitor.

2. For use in a peak reading device, a circuit comprising a capictor adapted to accumulate a charge proportional to the peak input voltage, a control voltage proportional to the peak input voltage and which under steady state conditions is of greater magnitude than the voltage developed across said capacitor, a pair of resistors connected in series and adapted to be connected to the input signal, said control voltage being developed by a circuit associated with both resistors, said capacitor being charged by a circuit associated with only one of said resistors, a unilaterally conductive device connected between said control voltage and said capacitor voltage in a manner such that said device is non-conducting under steady state conditions, and a discharge path for said capacitor voltage comprising said unilaterally conducting device and an impedance which in combination with said capacitor provides a relatively fast discharge time constant, whereby upon a decrease of input voltage, said control voltage decreases to enable the unilaterally conductive device to become conductive and enable said capacitor to discharge through said discharge path.

3. For use in a peak reading device, a circuit comprising at least one capacitor and at least one unilaterally conductive device with said capacitor adapted to accumulate a rectified charge voltage from said unilaterally conductive device proportional to the peak input voltage, a control voltage proportional to the peak input voltage and which under steady state input conditions is of greater magnitude than the voltage developed across said capacitor, another unilaterally conductive discharge device connected between said control voltage and said capacitor voltage in a manner such that said discharge device is non-conducting under steady state conditions, and a discharge path for said capacitor voltage comprising said other discharge device and an impedance which in combination with said capacitor provides a short RC time constant relative to the time interval between input pulses, whereby upon a decrease of input voltage, said control voltage decreases so that the discharge device becomes conductive and provides a discharge path for said capacitor.

4. For use in a peak reading device, a circuit comprising at least one capacitor and one diode with said capacitor adapted to accumulate a rectified charge voltage proportional to the peak input voltage, a control voltage circuit comprising at least one other capacitor and one other diode with said other capacitor adapted to accumulate a rectified charge voltage proportional to the peak input voltage and which under steady state input signal conditions is of a magnitude different than the voltage developed across said capacitor, a unilaterally conductive device connecting said control voltage and said capacitor voltage in a manner such that said device is non-conducting under steady state input signal conditions, and a discharge path for said capacitor voltage comprising said unilaterally conducting device, whereby upon a decrease of input voltage, said control voltage decreases to enable the unilaterally conductive device to become conductive and provide a discharge path for said capacitor.

5. For use in a peak reading device, a first circuit comprising at least one capacitor and at least one diode with said capacitor adapted to accumulate a rectified voltage charge proportional to the peak input voltage, a control voltage developed by a second circuit comprising at least one other capacitor and at least one other diode with said control voltage capacitor adapted to accumulate a rectified charge proportional to the input signal, a pair of impedances connected in series and adapted to be connected to the input signal, said second circuit connected across both of said impedances, said first circuit connected across only one of said impedances, a unilaterally conductive device connected between said control voltage and said capacitor voltage in a manner such that said device is non-conducting under steady state input conditions, and a discharge path for said capacitor voltage comprising said unilaterally conducting device, whereby upon a decrease of input voltage, said control voltage decreases to enable the unilaterally conducting device to become conductive and quickly discharge said capacitor to a level indicative of the lowered peak input voltage.

6. For use in a peak reading device, a circuit comprising at least one charging capacitor and at least one diode with said capacitor adapted to accumulate a rectified charge, the voltage of said rectified charge being proportional to the peak input signal, a control voltage which under steady state input signal conditions is of greater magnitude than the voltage developed across said capacitor, a cathode follower circuit adapted to be connected to said input signal and including a pair of resistors connected in series in the cathode circuit, said control voltage being developed by a circuit associated with both resistors, said charging capacitor circuit being associated with one of said resistors remote from the cathode, a unilaterally conductive device connected between said control voltage and said capacitor voltage in a manner such that said device is non-conducting under steady state input signal conditions, and a discharge path for said charging capacitor comprising said unilaterally conductive device, whereby upon a decrease of input voltage, said control voltage decreases to enable the unilaterally conductive device to become conductive.

7. For use in a peak reading device, a circuit comprising a capacitor adapted to accumulate a voltage charge proportional to the peak input signal, a control voltage which under steady state input signal conditions is of different magnitude than the voltage developed across said capacitor, a unilaterally conductive device connected between said control voltage and said capacitor voltage in a manner such that said unilaterally conductive device is non-conducting under steady state input signal conditions, and a discharge path for said charge voltage comprising said unilaterally conductive device said discharge path becoming conductive upon a decrease of the input signal through a change in said control voltage, said change providing the relative polarity across said unilaterally conductive device which enables conduction therethrough.

8. For use in a peak reading device, a circuit comprising a capacitor adapted to accumulate a voltage charge proportional to the peak input signal, a control voltage which is proportional to the peak input voltage and which under steady state input signal conditions is of greater magnitude than the voltage developed across said capacitor, a unilaterally conductive device connected between said control voltage and said capacitor voltage in a manner such that said device is non-conducting under steady state input signal conditions, and a discharge path for said capacitor voltage comprising said unilaterally conductive device and which in combination with said capacitor provides a relatively short RC time constant, whereby upon a decrease of input voltage said control voltage decreases and enables the unilaterally conductive device to become conductive and provide a discharge path for said capacitor.

9. For use in a peak reading device, a circuit comprising a pair of resistors connected in series and adapted to be connected to the input signal, a first circuit connected across only one of said resistors and comprising a first capacitor and a first diode connected in series across said one resistor, a second diode and a second capacitor connected in series across said first diode, said first and second diodes having unlike elements connected, a second circuit for developing a control voltage comprising a third capacitor and a third diode connected in series across both of said series connected resistors, a fourth diode and a fourth capacitor connected in series across said third diode, said fourth diode being connected so that the polarity of the elements of said third and fourth diodes are unlike at their junction, a fifth diode and a third resistor connected in series across said second capacitor, said fourth capacitor being connected to the junction between said fifth diode and said third resistor, and said fifth diode being connected in such a manner that it is not conducting under steady state input signal conditions.

10. For use in a peak reading device, a circuit comprising a pair of impedances connected in series and adapted to be connected to an input signal, a first circuit for developing a control signal comprising a first diode and a first capacitor connected in series across both of said impedances, a second circuit for developing a voltage proportional to the peak input voltage comprising a second diode and a second capacitor connected in series across one of said resistances, a third diode and an impedance connected in series across said second capacitor, and a connection between the junction of said third diode and said third impedance to the junction of said first diode and said first capacitor, said third diode being connected such that said third diode is non-conducting under steady state input conditions.

11. For use in a peak reading device, a circuit comprising a pair of resistors connected in series in the cathode circuit of a cathode follower with the grid of said cathode follower adapted to be connected to the input signal, a first circuit connected across the one of said resistors remote from the cathode and comprising a first capacitor and a first diode connected in series across said one resistor, a second diode, and a second capacitor connected in series across said first diode, said first and second diodes having unlike elements connected, a second circuit for developing a control voltage comprising a third capacitor and a third diode connected in series across both of said series connected resistors, a fourth diode and a fourth capacitor connected in series across said third diode, said fourth diode being connected so that the polarity of the elements of said third and fourth diodes are unlike at their junction, a fifth diode and a third resistor connected in series across said second capacitor, said fourth capacitor being connected to the junction between said fifth diode and said third resistor, and said fifth diode being connected in such a manner that it is not conducting under steady state input signal conditions, and a cathode follower output circuit with said second capacitor connected in the grid circuit.

12. For use in a peak reading device, a circuit comprising a pair of resistors connected in series and adapted to be connected to the input signal, a first circuit connected across only one of said resistors and comprising a first capacitor and a first diode connected in series across said one resistor, a second diode and a second capacitor connected in series across said first diode, said first and second diodes having unlike elements connected, a third resistor of a relatively large magnitude of resistance connected in parallel with said second capacitor, a second circuit for developing a control voltage comprising a third capacitor and a third diode connected in series across both of said series connected resistors, a fourth diode and fourth capacitor connected in series across said third diode, said fourth diode being connected so that the polarity of the elements of said third and fourth diodes are unlike at their junction, a fifth diode and a fourth resistor connected in series across said second capacitor, said fourth capacitor being connected to the junction between said fifth diode and said third resistor, and said fifth diode being connected in such a manner that it is not conducting under steady state input signal conditions.

References Cited in the file of this patent

UNITED STATES PATENTS 2,307,316 Wolff ---------------- Jan. 5, 1943